UNITED STATES PATENT OFFICE.

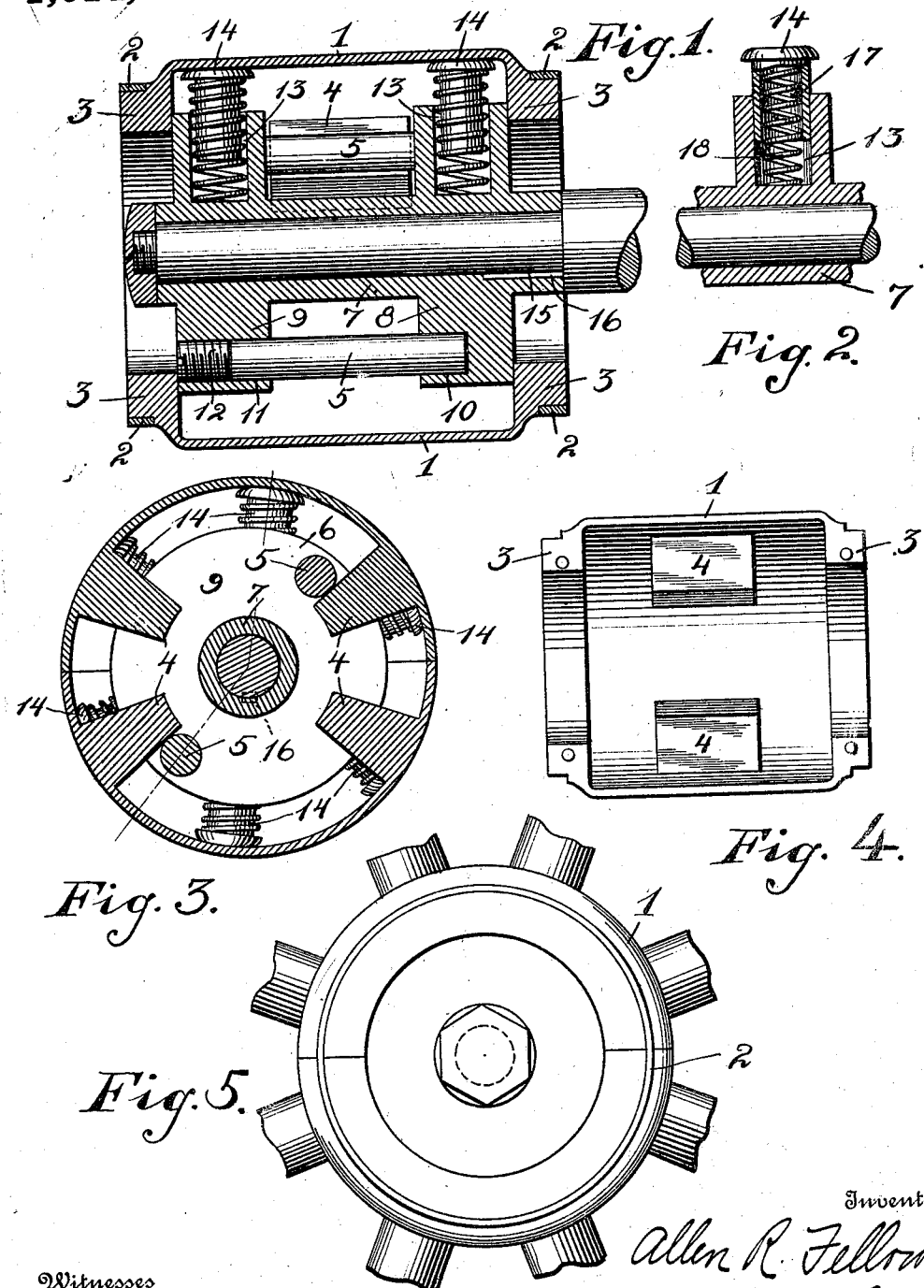

ALLEN R. FELLOWS, OF SIOUX FALLS, SOUTH DAKOTA.

SHOCK-ABSORBING HUB.

1,014,137.  Specification of Letters Patent.  Patented Jan. 9, 1912.

Application filed July 21, 1910. Serial No. 573,132.

*To all whom it may concern:*

Be it known that I, ALLEN R. FELLOWS, a citizen of the United States, residing at Sioux Falls, in the county of Minnehaha and State of South Dakota, have invented certain new and useful Improvements in Shock-Absorbing Hubs, of which the following is a specification.

The invention relates generally to vehicle-wheels, but more particularly to the hubs thereof of the shock-absorbing type; and it consists of the general construction of the several parts, their peculiar arrangement and novel combination, as will be hereinafter fully disclosed, and briefly stated in the claims.

One of the principal objects of the invention is to produce a hub of the type mentioned, that will be simple and inexpensive in construction, and most effective in absorbing the shock and strain caused by the wheel striking obstructions in the road-way.

Other objects and advantages of the invention will become apparent upon a more complete disclosure thereof.

In the drawing: Figure 1 is a longitudinal section of my improved hub; Fig. 2 is a vertical section of a slightly modified form of spring-pin; Fig. 3 is a central, transverse section of the hub; Fig. 4 is a plan view of the interior of one of the hub-sections, and Fig. 5 is an outer end view of the hub complete.

Referring to the several views, the numeral 1 indicates the outer shell of the hub, which is composed of two longitudinal sections secured together by suitable bands 2, 2, the respective ends of the hub being provided with inward, annular flanges 3, 3.

The inner wall of the shell is provided with a number of inwardly-projecting studs 4, which are adapted to be engaged by two driving or power rollers 5 of a shock-absorbing member 6, composed of a sleeve 7 and two disks 8 and 9, one end of the rollers being journaled in sockets 10 in the disk 8, and the other end in holes 11 in the disk 9. In placing the rollers in position, one end is passed through the hole 11 and inserted into the socket 10, after the outer end of the hole is closed by a plug 12, which may be screw-threaded and have its head provided with a slot, so that the plug may be removed if it is desired to replace an old roller with a new one. Each disk is peripherally provided with a plurality of sockets 13 in which are seated spring-pressed pins 14, the heads of which have a bearing against the inner wall of the shell.

The hub is locked to the arm of a rotatable axle by any suitable and well-known means, preferably by providing the axle-arm with a feather or key 15 and the inner wall of the sleeve with a spline 16.

It will be noted that the studs 4, preferably four in number, are arranged in pairs, the studs of each pair being spaced a short distance apart, while the distance between a stud of each pair is much greater, and as a driving-roller is positioned in each of the greater spaces, it will be obvious that the shock-absorbing member will have an oscillatory movement, and a greater amount of play in either direction, than if said driving rollers were positioned between the more limited spaces between each pair of the driving-rollers, so that the wheel will have a slight revolution before the rollers engage the studs, thereby providing steady and uniform running. In operation, the rollers engage those studs remaining out of commission. The shock, caused by encounter with obstructions in the road-way, will be absorbed or cushioned by the shock-absorber, so that a smooth and easy riding motion of the vehicle will be obtained. It will also be noted that the disks of the shock-absorbing member fit closely against the flanges of the shell, and serve not only to prevent dust and dirt entering the interior of the hub, but also to maintain the wheels in true running position.

Various modifications or changes in the details of construction of my improved hub, without limiting the scope of the invention, may be made, and it will be obvious that the hub is equally well adapted for self-propelling wheels, it only being necessary to dispense with the connection between the sleeve and arm of the axle, and the power-rollers if desired.

In the modification shown in Fig. 2, the pin of the spring-pressed pin 14 is provided with a socket 17, which adapts it to receive the coil-spring 18. which, in this form, is interposed between the pin and the bottom of the socket 13.

Although the driving or power-wheels are shown positioned in the wider spaces between the studs 4, it will be evident that they may be placed in the more contracted spaces between said studs if less movement in starting and stopping be required, and it will be obvious that the number of spring-pressed pins may be increased or decreased at will.

Having thus described my invention, what I claim is:—

1. A shock-absorbing hub for vehicle wheels, comprising a longitudinally-divided outer shell provided on its inner wall with inwardly-projecting studs, an inner shell provided at opposite ends with annular, integral disks, shock-absorbing devices carried by said disks, and rollers journaled in the disks and adapted to engage the studs, whereby the outer shell will be caused to revolve.

2. A shock-absorbing hub for vehicle wheels, comprising a longitudinally-divided outer shell provided on its inner wall with inwardly-projecting pairs of studs, an inner shell provided with annular, integral disks carrying shock-absorbing devices, and rollers journaled in the disks and adapted to be so arranged in relation to the inwardly-projecting studs that the wheel may have a lesser or greater movement before engaging said studs.

3. A shock-absorbing hub for vehicle wheels, comprising a longitudinally-divided outer shell provided on its inner wall with a number of studs arranged to provide alternately wide and narrow spaces therebetween, an inner shell provided with annular, integral disks carrying shock-absorbing devices, and driving-rollers carried by said disks and operative in the wider spaces between the studs, so that the wheel will have a greater movement before the studs are engaged by the rollers, than if said rollers were positioned in the narrow spaces.

In testimony whereof I affix my signature in presence of two witnesses.

ALLEN R. FELLOWS.

Witnesses:
 JNO. A. KLAPP,
 C. N. GUNNISON.